United States Patent
Juravicius et al.

(10) Patent No.: US 11,809,509 B2
(45) Date of Patent: *Nov. 7, 2023

(54) ADAPTIVE DATA COLLECTION OPTIMIZATION

(71) Applicant: OXYLABS, UAB, Vilnius (LT)

(72) Inventors: Martynas Juravicius, Vilnius (LT); Erikas Bulba, Vilnius (LT); Mantas Briliauskas, Vilnius (LT)

(73) Assignee: OXYLABS, UAB, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 18/181,742

(22) Filed: Mar. 10, 2023

(65) Prior Publication Data

US 2023/0214436 A1    Jul. 6, 2023

Related U.S. Application Data

(63) Continuation of application No. 17/823,660, filed on Aug. 31, 2022, which is a continuation of application No. 17/655,932, filed on Mar. 22, 2022, now Pat. No. 11,468,137, which is a continuation of application No. 17/454,074, filed on Nov. 9, 2021, now Pat. No. 11,314,833.

(60) Provisional application No. 63/260,530, filed on Aug. 24, 2021.

(51) Int. Cl.
*G06F 16/955* (2019.01)
*G06F 16/951* (2019.01)
*G06F 11/34* (2006.01)

(52) U.S. Cl.
CPC ........ *G06F 16/955* (2019.01); *G06F 11/3409* (2013.01); *G06F 16/951* (2019.01)

(58) Field of Classification Search
CPC ... G06F 16/955; G06F 16/951; G06F 11/3409
See application file for complete search history.

(56) References Cited

U.S. PATENT DOCUMENTS

| | | |
|---|---|---|
| 10,061,300 B1 | 8/2018 | Coffman et al. |
| 10,127,605 B2 | 11/2018 | Li et al. |
| 10,311,120 B2* | 6/2019 | Cai ...................... G06F 16/954 |
| 10,334,016 B2 | 6/2019 | Wei et al. |
| 10,482,149 B2* | 11/2019 | Gururaj ................ G06F 16/955 |
| 10,614,452 B2 | 4/2020 | Tomasofsky et al. |

(Continued)

*Primary Examiner* — Huawen A Peng
(74) *Attorney, Agent, or Firm* — FISHERBROYLES, LLP; Keats Quinalty

(57) ABSTRACT

Systems and methods to intelligently optimize data collection requests are disclosed. In one embodiment, systems are configured to identify and select a complete set of suitable parameters to execute the data collection requests. In another embodiment, systems are configured to identify and select a partial set of suitable parameters to execute the data collection requests. The present embodiments can implement machine learning algorithms to identify and select the suitable parameters according to the nature of the data collection requests and the targets. Moreover, the embodiments provide systems and methods to generate feedback data based upon the effectiveness of the data collection parameters. Furthermore, the embodiments provide systems and methods to score the set of suitable parameters based on the feedback data and the overall cost, which are then stored in an internal database.

20 Claims, 11 Drawing Sheets

(56) References Cited

U.S. PATENT DOCUMENTS

| | | | |
|---|---|---|---|
| 10,735,322 | B2 | 8/2020 | Alstad et al. |
| 10,756,995 | B2 | 8/2020 | Schibler et al. |
| 10,965,770 | B1 | 3/2021 | Vilcinskas et al. |
| 10,990,940 | B1 | 4/2021 | Asthana et al. |
| 2005/0091140 | A1 | 4/2005 | Sloan et al. |
| 2010/0274815 | A1 | 10/2010 | Vanasco |
| 2012/0167197 | A1 | 6/2012 | Kruger et al. |
| 2014/0046754 | A1 | 2/2014 | Lee et al. |
| 2014/0075004 | A1 | 3/2014 | Van Dusen et al. |
| 2017/0147973 | A1 | 5/2017 | Szmajda et al. |
| 2017/0193110 | A1 | 7/2017 | Crabtree et al. |
| 2017/0235584 | A1 | 8/2017 | Tchapda |
| 2019/0095785 | A1* | 3/2019 | Sarkar .................. G06N 20/00 |
| 2019/0095849 | A1 | 3/2019 | Sweeney et al. |
| 2019/0332720 | A1* | 10/2019 | Jeong .................. G06F 11/079 |
| 2020/0210892 | A1 | 7/2020 | Billingsley et al. |
| 2020/0234205 | A1 | 7/2020 | Apps et al. |
| 2020/0320404 | A1* | 10/2020 | Lutfi .................. G06N 3/08 |
| 2021/0042038 | A1* | 2/2021 | Sidorkin .................. G06N 5/022 |
| 2021/0211452 | A1 | 7/2021 | Patel et al. |
| 2022/0050695 | A1* | 2/2022 | Gajendran .................. G06N 20/00 |
| 2022/0245507 | A1 | 8/2022 | Yen et al. |
| 2022/0414533 | A1* | 12/2022 | Mohanty .................. G06N 20/00 |

\* cited by examiner

ADAPTIVE DATA COLLECTION OPTIMIZATION

CROSS-REFERENCE TO RELATED APPLICATIONS

The present application is a continuation of U.S. patent application Ser. No. 17/823,660, filed Aug. 31, 2022, which is a continuation of U.S. patent application Ser. No. 17/655,932, filed Mar. 22, 2022, now U.S. Pat. No. 11,468,137, which issued Oct. 11, 2022, which is a continuation of U.S. patent application Ser. No. 17/454,074, filed Nov. 9, 2021, now U.S. Pat. No. 11,314,833, which issued Apr. 26, 2022, which claims the benefit of U.S. Provisional Patent Application No. 63/260,530, filed Aug. 24, 2021, the entire contents of each of which are incorporated herein by reference as if repeated herein.

FIELD

The disclosure belongs to the area of web scraping and data collection technologies. Methods and systems detailed herein aim to optimize web scraping processes, wherein, the optimization is achieved through employing machine learning algorithms.

BACKGROUND

Web scraping (also known as screen scraping, data mining, web harvesting) in its most general sense is the automated gathering of data from the internet. More technically, it is the practice of gathering data from the internet through any means other than a human using a web browser or a program interacting with an application programming interface (API). Web scraping is usually accomplished by executing a program that queries a web server and requests data automatically, then parses the data to extract the requested information.

Web scrapers are programs written for web scraping that can have a significant advantage over other means of accessing information, like web browsers. The latter are designed to present the information in a readable way for humans, whereas web scrapers are excellent at collecting and processing large amounts of data quickly. Rather than opening one page at a time through a monitor (as web browsers do), web scrapers are able to collect, process, aggregate and present large databases consisting of thousands or even millions of pages at once.

In some instances, the website allows another automated way to transfer its structured data from one program to another via an API. Typically, a program will make a request to an API via Hypertext Transfer Protocol (HTTP) for some type of data, and the API will return this data from the website in a structured form. It serves as a medium to transfer the data. However, using APIs is not considered web scraping since the API is offered by the website (or a third party) and it removes the need for web scrapers.

An API can transfer well-formatted data from one program to another and the process of using it is easier than building a web scraper to get the same data. However, APIs are not always available for the needed data. Also, APIs often use volume and rate restrictions and limit the types and the format of the data. Thus, a user would use web scraping for the data for which an API does not exist or which is restricted in any way by the API.

Typically, web scraping consists of the following steps: retrieving Hypertext Markup Language (HTML) data from a website; parsing the data for target information/data; saving target information/data; repeating the process if needed on another page. A program that is designed to do all of these steps is called a web scraper. A related program—a web crawler (also known as a web spider)—is a program or an automated script which performs the first task, i.e. it navigates the web in an automated manner to retrieve raw HTML data of the accessed web sites (this process is also known as indexing).

Scraping activity may be performed/executed by multiple types of scraping applications, generally categorized as follows:

Browser—an application executed within a computing device, usually in the context of an end-user session, with the functionality sufficient to accept the user's request, pass it to the target Web server, process the response from the Web server and present the result to the user. Browser is considered a user-side scripting enabled tool e.g. capable of executing and interpreting JavaScript code.

Headless browser—a web browser without a graphical user interface (GUI). Headless browsers provide automated control of a web page in an environment similar to popular web browsers but are executed via a command-line interface or using network communication. They are particularly useful for testing web pages as they are able to render and understand HTML the same way a browser would, including styling elements such as page layout, color, font selection and execution of JavaScript and AJAX which are usually not available when using other testing methods. Two major use cases can be identified: a) scripted web page tests—with the purpose of identifying bugs, whereas a close resemblance to a user activity is necessary. b) web scraping—where resemblance to a user activity is mandatory to avoid blocking. i.e. the request should possess all the attributes of an organic web browsing request. Headless browser is considered a user-side scripting enabled tool e.g. capable of executing and interpreting JavaScript code.

Command line tools—GUI-less applications that allow to generate and submit a Web request through a coma and line terminal e.g. CURL. Some tools in this category may have a GUI wrapped on top, but the graphical elements would not cover displaying the result of the HTTP request. Command line tools are limited in their functionality in that they are not capable of executing and interpreting JavaScript code.

Programming language library—a collection of implementations of behavior, written in terms of a language, that has a well-defined interface by which the behavior is invoked. For instance, when particular HTTP methods are to be invoked for executing scraping requests the scraping application can use a library containing said methods to make system calls instead of implementing those system calls over and over again within the program code. In addition, the behavior is provided for reuse by multiple independent programs, where the program invokes the library-provided behavior via a mechanism of the language. Therefore, the value of a library lies in the reuse of the behavior. When a program invokes a library, it gains the behavior implemented inside that library without having to implement that behavior itself. Libraries encourage the sharing of code in a modular fashion, and ease the distribution of the code. Programming language libraries are limited in their functionality in that they are not capable of executing and interpreting JavaScript code, unless there is another tool capable of user-side scripting, for which the library is a wrapper.

The scraping application types listed above vary in the technical capabilities they possess, often due to the very purpose the application has been developed for. While sending the initial request to the target Web server all of the listed types of scraping applications pass the parameters mandatory for submitting and processing a web request. e.g. HTTP parameters—headers, cookies, declare the version of HTTP protocol they support and intend to communicate in, with Transmission Control Protocol (TCP) parameters disclosed while initiating the TCP session underlying the HTTP request (e.g. TCP Windows size and others). As described above browsers and headless browsers can process the JavaScript files obtained within the web server's response e.g. submit configuration settings through JavaScript when requested, while command line utilities are incapable of doing that.

While processing the web server's response all of the listed types of scraping applications are capable of obtaining, interpreting, rendering or otherwise processing, and presenting the HTTP metadata and the main HTML document, whereas some of the listed scraping applications do not possess the functionality of processing the additional files obtained from the web target's response e.g. executing scripted code client side. Therefore, a practical classification of web harvesting tools is based on their ability to execute and interpret JavaScript code.

As described above browsers and headless browsers can process the JavaScript files obtained within the web server's response e.g. submit configuration settings through JavaScript when requested, while command line utilities and programming language libraries are incapable of doing that.

It would be appropriate here, to diverge to the subject of machine learning which has gained significant value in the field of computing and information technology. In recent times, artificial intelligence (AI) has become one of the vital developments in computing and networking technology. Artificial intelligence and machine learning has a positive impact on the way the information technology sector works. Machine learning is a branch of artificial intelligence (AI) and computer science which focuses on the use of data and algorithms to imitate the way that humans learn, gradually improving its accuracy. The goal of Machine Learning technology is to optimize the performance of a system when handling new instances of data through user defined logic for a given environment. To achieve this goal effectively, machine learning depends immensely upon statistical and computer sciences. Statistical methods provide machine learning algorithms ways to infer conclusions from data. Computer science methods, on the other hand, give machine learning algorithms the computing power to solve problems, including useful large-scale computational architectures and algorithms for capturing, manipulating, indexing, combining and performing the predictions with data.

In the field of networking and computing, machine learning technologies are mainly applied to analysis, prediction, permission control, and personalization. For example, machine learning technologies are used to predict privacy preferences of mobile users when using smart applications. Machine learning has become an important component of the growing field of computer science. Through the use of statistical methods, machine learning algorithms are trained to make classifications or predictions, finding key insights within data sets. These insights subsequently drive decision making within applications and businesses, ideally improving the development metrics.

An 'algorithm' in machine learning is a procedure that is run on data to create a machine learning 'model'. Machine learning algorithms can learn and perform pattern recognition present within data sets. For example, Linear Regression, Logistic Regression, Decision Tree and Artificial Neural Network are some of the few examples of machine learning algorithms. Few exemplary features of machine learning algorithms are: a) Machine learning algorithms can be described using math and pseudocode. b) The efficiency of machine learning algorithms can be analyzed and described. c) Machine learning algorithms can be implemented with any one of a range of modern programming languages.

A 'model' in machine learning is the output of a machine learning algorithm. A model represents what was learnt by a machine learning algorithm. Model is the result constructed after running a machine learning algorithm on training data sets and represents rules, numbers, and any other algorithm-specific data structures required to make predictions.

In general, there are three main paradigms in machine learning: supervised learning, unsupervised learning and reinforcement learning. Supervised learning is the type of machine learning where a problem is defined and the system is provided with multiple examples of how the problems may be solved through curated and validated examples. In contrast to supervised learning, unsupervised learning does not work on improving itself based on "experience" to solve clearly-defined problems. Instead, this form of machine learning is actually designed to seek out and identify patterns from within large sets of incongruous data. Unsupervised data attempts to group (cluster) the data based on various attributes that are recognized from processing. This, in turn, sets the stage for humans to analyze the processed data, recognize non-obvious correlations between elements, and establish relationships between vast amounts of data (wherever applicable).

The third type of machine learning, which is reinforcement learning, is about allowing computer systems to experiment with all possible means and methods for executing a task, scoring all those different iterations based on clearly-defined performance criteria and then choosing the method with the best score for deployment. The computer system will be rewarded with points for meeting success criteria and penalized for failing some or all of them in each reinforcement iteration.

Returning back to the subject of web scraping, there are instances when target websites detect the scraping requests and may attempt to slow down or block the incoming scraping process. Web scraping requests can overload websites; therefore, websites often resolve to detect and eliminate scraping requests. For instance, a website may attempt to recognize and block specific IP addresses that send scraping requests.

There are many ways in which a website can recognize the bot-like behaviour of web scrapers. One such way is to monitor the number and durations of requests, i.e., the rate of action (or actions over time). This is because humans typically perform fewer actions/requests than a bot or a computer application. Therefore, by monitoring the rate of actions, websites can detect and block any bot-like behaviour originating from an IP address.

Web scrapers often face financial losses when several scraping attempts fail or are blocked. Therefore, to circumvent such instances, web scrapers need to intelligently choose multiple parameters or strategies to execute each scraping request successfully.

Employing proxy servers from different geo-locations, choosing different types of proxy servers, sending scraping requests through different operating system configurations, and utilizing different protocol versions are exemplary parameters or strategies currently used by web scrapers.

However, using the right combination of scraping parameters is crucial for the successful execution of scraping requests. Choosing scraping parameters or strategies at random can never ensure the success of scraping requests at every instance. Furthermore, in order to successfully execute the scraping requests, web scrapers must try to adapt and identify parameters or strategies depending on the nature of the requests, targets, proxies etc. For instance, a particular combination of scraping parameters or strategies may not always be successful on a particular target website.

Thus, web scrapers are in need of methods and systems to intelligently identify and select the most effective parameters or strategies to execute their scraping requests individually. Additionally, web scrapers need the capabilities to analyze the clients' requests to decide upon the optimal combination of parameters or strategies to execute the individual scraping requests. Nevertheless, implementing such methods can be resource-intensive and time consuming for web scraping service providers.

However, the present embodiments disclosed herein provide at least the following solutions: a) to intelligently choose and adapt the right combination of scraping parameters or strategies according to the nature of the individual scraping requests and their respective targets; b) to implement several machine learning algorithms to aid the process of choosing the right combination of scraping parameters; c) to evaluate and score the parameters based on their effectiveness in executing the scraping requests. d) to choose the right combination of parameters based on their cost-effectiveness.

SUMMARY

Systems and methods for optimizing the web scraping processes are disclosed. The embodiments presented herewith, at least in one aspect, provides a system and method for choosing the right combination of data collection parameters for each data collection request originating from a user. The right combination of data collection parameters is achieved by implementing a machine learning algorithm. Moreover, the chosen data collection parameters are cost-effective in executing the data collection requests. In another aspect, the present embodiments provide a system and method to generate feedback data according to the effectiveness of the data collection parameters. Additionally, the present embodiments score the data collection parameters according to the feedback data and the overall cost, which are then stored in an internal database.

DETAILED DESCRIPTION

Figure 1:
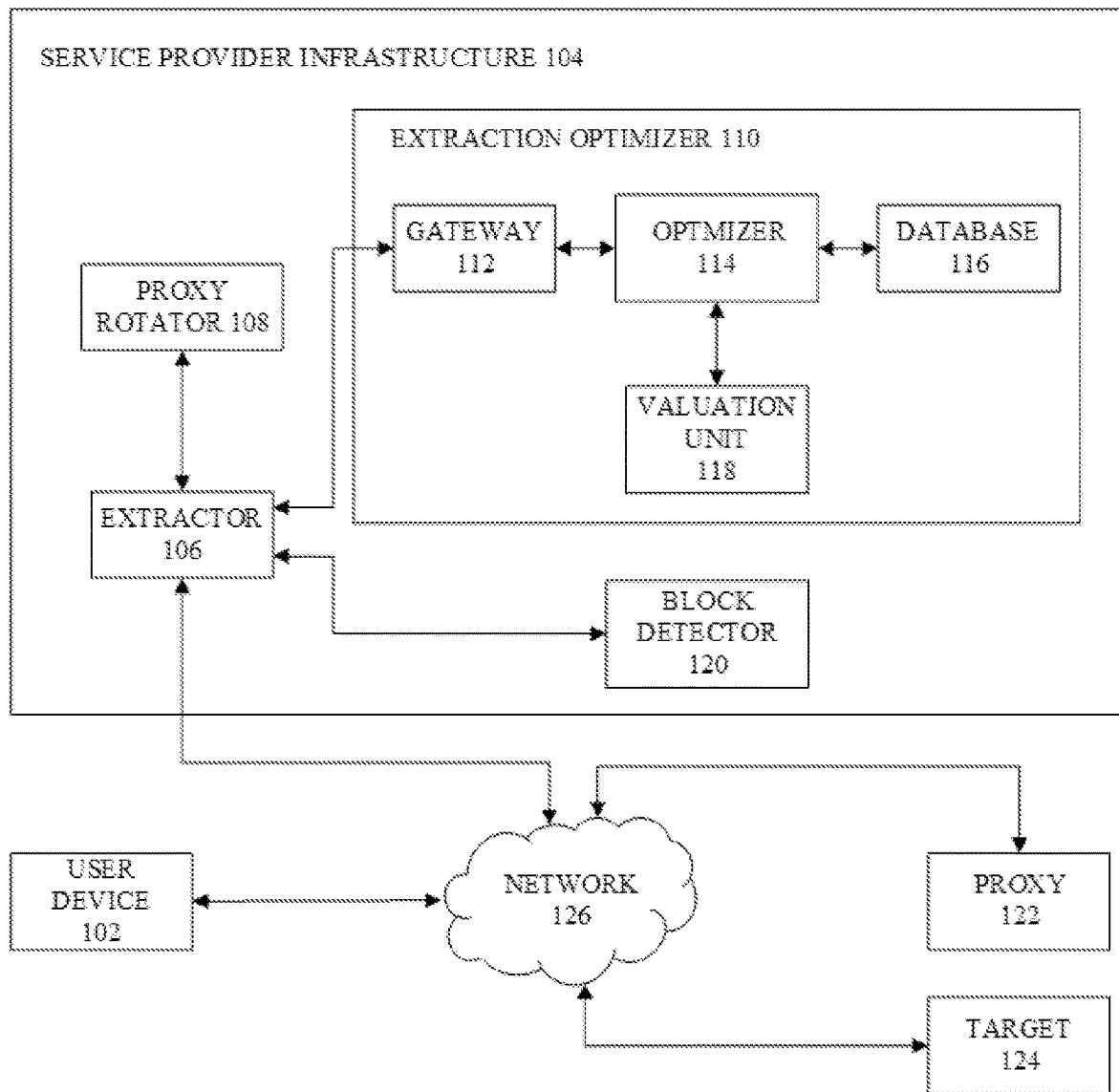
FIG. 1 shows a block diagram of an exemplary architectural depiction of elements.

Some general terminology descriptions may be helpful and are included herein for convenience and are intended to be interpreted in the broadest possible interpretation. Elements that are not imperatively defined in the description should have the meaning as would be understood by a person skilled in the art.

User device 102 can be any suitable user computing device including, but not limited to, a smartphone, a tablet computing device, a personal computing device, a laptop computing device, a gaming device, a vehicle infotainment device, an intelligent appliance (e.g., smart refrigerator or smart television), a cloud server, a mainframe, a notebook, a desktop, a workstation, a mobile device, or any other electronic device used for making a scraping request. Additionally, it should be noted that the term "user" is being used in the interest of brevity and may refer to any of a variety of entities that may be associated with a subscriber account such as, for example, a person, an organization, an organizational role within an organization and/or a group within an organization. Furthermore, user device 102 can send requests to collect data from target website(s) (represented by target 124). User device 102 sends the data collection requests to extractor 106, present in the service provider infrastructure 104. Data collection requests sent by user device 102 can be synchronous or asynchronous and may be sent in different formats.

Service provider infrastructure 104 (SPI 104) is the combination of the elements comprising the platform that provides the service of collecting data from target website(s) efficiently by executing the data collection requests sent by user device 102. In the current exemplary embodiments, SPI 104 comprises extractor 106, extraction optimizer 110, block detection unit 120 and proxy rotator 108.

Extractor 106 is an element of the service provider infrastructure 104 that, among other things, is responsible for receiving and executing the data collection requests sent by user device 102. One role of extractor 106 is to request a set of suitable parameters from extraction optimizer 110 for executing the data collection requests. Extractor 106 executes the data collection requests by adhering to a set of suitable parameters through an appropriate proxy server (represented by proxy 122). Upon receiving the response data from the target website(s), extractor 106 returns the data to the user device 102 or executes additional data collection activities upon identifying a discrepancy in the response data. Another important role of the extractor 106 is to send feedback data to extraction optimizer 110 after completing the execution of each data collection request. The feedback data contains information regarding the effectiveness of a set of suitable parameters received from extraction optimizer 110.

In some embodiments, extractor 106 may be a third party element not present within the service provider infrastructure 104 but communicably connected to extractor optimizer 202, proxy rotator 108 and block detector 120. However, such an arrangement will not alter the functionality of extractor 106 in any way.

Extraction optimizer 110 is an element of service provider infrastructure 104. Extractor optimizer 110 comprises elements that, among other things, are responsible for identifying and selecting the suitable set of parameters for each data collection request executed by extractor 106. In the embodiments described herein, extractor optimizer 110 comprises gateway 112, optimizer 114, database 116, and valuation unit 118.

Block detector 120 is an element of service provider infrastructure 104 and is responsible for evaluating and classifying the response data as either 'block' or a 'non-block'. Block detector 120 receives the response data from extractor 106 to evaluate and classify the response data, and after the classification process, block detector 120 returns the classification results to extractor 106. A 'non-block' response data contains the actual content requested by the user device 102. Block detector 120 may comprise multiple components (not shown) that provide the functionalities described above.

Proxy rotator 108 is an element of service provider infrastructure 104 and is responsible for proxy control, rotation, maintenance, and collecting statistical data. Proxy rotator 108 receives requests from extractor 106 for information regarding specific proxy servers. In response to such requests, proxy rotator 108 provides appropriate proxy server information such as, for example, IP addresses to extractor 106.

Proxy 122 represents an exemplary multitude of proxy servers (computer systems or applications), that acts as an intermediary element between extractor 106 and target 124 in executing the data collection requests. Proxy 122 receives the data collection requests from extractor 106 and forwards data collection requests to target websites(s) (represented by target 124). Further, proxy 122 receives the response data sent by target 124 and forwards the response data to extractor 106.

Target 124 represents an exemplary multitude of web servers serving content accessible through several internet protocols. target 124 is presented here as an exemplary representation that there can be more than one target, but it should not be understood in any way as limiting the scope of the disclosure.

Network 126 is a digital telecommunication network that allows several elements of the current embodiments to share and access resources. Examples of a network: local-area networks (LANs), wide-area networks (WANs), campus-area networks (CANs), metropolitan-area networks (MANs), home-area networks (HANs), Intranet, Extranet, Internetwork, Internet.

Gateway 112 is an element of the extraction optimizer 110 and is responsible for providing interoperability between the elements of extraction optimizer 110 and the elements of SPI 104. In computer networking, the term interoperability denotes the continuous ability to send and receive data among the interconnected elements in a system. Gateway 112 receives and forwards requests for the suitable set of parameters from extractor 106 to optimizer 206, respectively. Further, gateway 112 receives and forwards the suitable set of parameters from optimizer 206 to extractor 106, respectively.

Optimizer 204 is an element of extraction optimizer 110 that, among other things, is responsible for identifying and selecting the suitable parameters for executing each data collection request. Optimizer 114 obtains the necessary information to identify and select a suitable set of parameters for executing a data collection request from database 116. Moreover, the identification and selection of suitable sets of parameters are carried out by optimizer 114 by employing machine learning algorithms. Additionally, optimizer 204 receives the feedback data sent by extractor 106 via gateway 112 and forwards the feedback data to valuation unit 118.

Database 116 is an element of extraction optimizer 110 and is a storage unit that stores multiple sets of parameters coupled with their respective scores received from optimizer 114.

Valuation unit 118 is an element of extraction optimizer 110 and is responsible for scoring each set of suitable parameters sent by optimizer 114. Valuation unit 118, among other things, may comprise configuration files. These configuration files may contain cost values for each data collection parameter. Additionally, valuation unit 118 may comprise computing elements capable of calculating the costs for a given set of data collection parameters. Further, valuation unit 118, among other things, is responsible for scoring the set of suitable parameters based on the feedback data and the overall cost to implement the set of suitable parameters while executing the particular data collection request. Moreover, valuation unit 118 may assign the scores based on a specific machine learning algorithm. In some embodiments, configuration files can be stored externally to valuation unit 118.

In one aspect, the embodiments disclosed herein provide a plurality of systems and methods to optimize data collection requests by intelligently identifying suitable parameters and executing such requests efficiently. Further, the embodiments disclosed herein utilize machine learning algorithms to intelligently identify specific, cost-effective and suitable parameters to execute each data collection request originating from user device 102. These suitable parameters allow selection of a scraping strategy, which can be selected, for example, to save financial costs and, in at least one instance, to allow a strategy that is cheaper to be selected and implemented in lieu of another strategy implemented at a higher cost. In at least this example, the cheaper strategy provides the same or similar efficiency to the more expensive strategy. In at least one example, the cheaper strategy can include using cheaper exit nodes (e.g., data center exit nodes) to implement a user request. The term 'parameter', as described herein, may refer to a wide range of specifications that are necessary to execute data collection requests successfully and efficiently. At times, the term 'parameter(s)' or 'data collection parameter(s)' may be used interchangeably with each other. For example, parameters may include specifications about the required type of proxy, the required location of the proxy server, and the required type of operating system. To expand further, a typical list of parameters that are essential for successful data collection requests are, but are not limited to:

proxy type;
proxy location;

proxy ASN (Autonomous System Number);
Operating system preference;
Browser preference;
conditions for headers;
protocol type and version.

Moreover, the number of parameters required may differ depending on the nature of the data collection request and the type of target website(s). In one aspect, the embodiments disclosed herein provide a solution to identify the right combination/set of suitable and cost-effective parameters for executing each data collection request originating from user device 102.

The embodiments demonstrated in FIG. 1 show user device 102 communicating with service provider infrastructure 104 via network 126 to acquire data from target 124. In FIG. 1, the service provider infrastructure 104 comprises extractor 106, extraction optimizer 110, block detection unit 120 and proxy rotator 108. The extraction optimizer 110 further comprises gateway 112, optimizer 114, database 116, and valuation unit 118.

Furthermore, in FIG. 1, network 126, as described before, can be local-area networks (LANs), wide-area networks (WANs), campus-area networks (CANs), metropolitan-area networks (MANs), home-area networks (HANs), Intranet, Extranet, Internetwork, Internet. However, the Internet is the most relevant network for the functioning of the present embodiment. Connection to network 126 may require that the user device 102, service provider infrastructure 104, proxy 122, and target 124 execute software routines that enable, for example, the seven layers of the OSI model of the telecommunication network or an equivalent in a wireless telecommunication network.

In some embodiments, the elements shown in FIG. 1 can have alternative names or titles. Moreover, the elements shown in FIG. 1 can be combined into a single element instead of two discrete elements (for example, gateway 112 and proxy optimizer 114 can be co-located as a single element.) However, the functionality and the communication flow between elements are not altered by such consolidations. Therefore, FIG. 1, as shown, should be interpreted as exemplary only and not restrictive or exclusionary of other features, including features discussed in other areas of this disclosure.

Within the service provider infrastructure 104, extractor 106 can communicate with outside elements such as user device 102 and proxy 122 via network 126. In FIG. 1, all communication occurrences between the elements occur through standard network communication protocols such as, but not limited to, TCP/IP, UDP.

In operation, user device 102 initially establishes a network communication channel with extractor 104 via network 126 as per standard network communication protocols, e.g., HTTP(S). A network communication protocol provides a system of rules that enables two or more entities in a network to exchange information. The protocols define rules, syntaxes, semantics and possible error recovery methods. Upon establishing the network communication channel with extractor 106, user device 102 sends a data collection request to collect and/or gather data from target 124. The data collection request is sent to extractor 106 by user device 102 via network 126. The data collection request, among other things, may comprise an URL of the target (in this case, the URL of target 124) coupled with one or more parameters for executing the particular data collection request. User device 102 may include one or more parameters such as, for example, proxy location and proxy type depending upon the resources available to user device 102 and on the configuration of the extractor 106.

Extractor 106 receives the data collection request and, in turn, requests optimizer 114 via gateway 112 for a set of suitable parameters to efficiently execute the data collection request. In one embodiment, the service provider infrastructure 104 may configure extractor 106 to disregard every parameter sent by user device 102. In such an embodiment, extractor 106 requests optimizer 114 via gateway 112 for a complete set of suitable parameters to execute the data collection request on target 124. Here, a 'set of suitable parameters' or a 'complete set of suitable parameters' or 'complete set' may refer to a list of specific parameters suitable to effectively execute the particular data collection request. Moreover, the number of parameters present in a 'complete set of suitable parameters' depends on the policy configuration of extractor 106 and service provider infrastructure 104.

In another embodiment, the service provider infrastructure 104 may configure extractor 106 to accept one or more parameters sent by user device 102 and disregard rest of the parameters. In such an embodiment, extractor 106 communicates the accepted parameter(s) to optimizer 114 and requests for a partial set of suitable parameters. Here, the partial set of suitable parameters will comprise the accepted parameter(s) coupled with several other suitable parameters necessary to effectively execute the particular data collection request.

Optimizer 114 receives the request for a set of parameters (either for a complete set or a partial set) from extractor 106 via gateway 112. Optimizer 112 responds to the request received from extractor 106 by initiating the process of identifying and selecting a set of suitable parameters. Specifically, optimizer 114 identifies and selects a set of suitable parameters by accessing database 116 and by implementing a machine learning algorithm. Moreover, the type of machine learning algorithm used by optimizer 114 is determined by service provider infrastructure 104.

Optimizer 114 identifies, selects and sends a set of suitable parameters to extractor 106 via gateway 112. Upon receiving a set of suitable parameters, extractor 106 requests proxy rotator 108, the information regarding a specific proxy server contained in the particular set of suitable parameters. Following which, extractor 106 may amend the original data collection request according to the particular set of suitable parameters. Subsequently, extractor 106 executes the request by adhering to the set of suitable parameters received from optimizer 114.

Proxy 122 receives the data collection request from extractor 106 and forwards the request to target 124. Consecutively, target 124 responds to the data collection request by providing appropriate response data. Specifically, proxy 122 receives the response data from target 124 and forwards the response data to extractor 106.

Upon receiving the response data, extractor 106 sends the response data to block detector 120, which evaluates and classifies the response data as either 'block' or 'non-block'. Extractor 106, among other reasons, sends the response data to block detector 120 to ascertain the effectiveness of the particular set of parameters. A set of suitable parameters (complete or partial), identified and selected by optimizer 114 to be effective on a target, might not be successful while executing data collection requests in every instance. Web targets (such as Target 124) can respond differently (i.e., can block or decline service) each time for the same set of suitable parameters.

Here, a 'block' classification implies that the response data contain a block or no valid data (or any other technical measure intended to restrict access to data or resources). On the contrary, a 'non-block' classification implies that the response data contain valid data and can be returned to user device 102. Block detector 120 sends the classification decision to extractor 106 coupled with the probability percentile for the classification decision.

Extractor 106 receives and analyzes the classification decision from block detector 120. Consequently, extractor 106 prepares and sends feedback data to optimizer 114 via gateway 112. Feedback data sent by extractor 106 is intended to communicate the effectiveness of the particular set of suitable parameters in executing the data collection request on target 124.

The effectiveness of the suitable set of parameters is said to be insufficient when the classification decision received from block detector 120 is a 'block'. On the contrary, the effectiveness of the suitable set of parameters is said to be optimal when the classification decision received from the block detector 120 is a 'non-block'. Therefore, according to the classification decision, extractor 106 sends the feedback data to optimizer 114 via gateway 112. Feedback data, among other things, may comprise the classification decision, URL of target 124, the particular set of suitable parameters.

After sending the feedback data, extractor 106 may either:
a. forward the response data to user device 102 if the classification decision is a 'non-block' or
b. request a different set of suitable parameters again from optimizer 114 via gateway 112 to effectively execute the data collection request if the classification decision is a 'block'. The process of requesting a suitable set of parameters and executing the data collection request repeats until the classification decision received from block detector 120 is a 'non-block'.

The feedback data that was sent by extractor 106 to optimizer 114 via gateway 112 is forwarded to valuation unit 118. That is, optimizer 114 forwards the feedback data to valuation unit 118. Consequently, valuation unit 118 scores the particular set of suitable parameters (either the complete set or partial set) according to the received feedback data. Specifically, valuation unit 118 scores based on the feedback data and the overall cost to implement the set of suitable parameters while executing the particular data collection request. For instance, valuation unit 118 may assign the highest score to the set of parameters that has a 'non-block' classification decision and lowest implementation cost. Similarly, valuation unit 118 may assign the lowest score to the set of parameters that has a 'block' classification decision and highest implementation cost. Valuation unit 118 may score a particular set of suitable parameters based on a specific machine learning algorithm.

After scoring the particular set of suitable parameters, valuation unit 118 sends the score of the particular set of suitable parameters to optimizer 114. The score of the particular set of suitable parameters is sent to database 116 by optimizer 114, where the score is stored coupled with the particular set of suitable parameters in database 116.

Figure 2A:
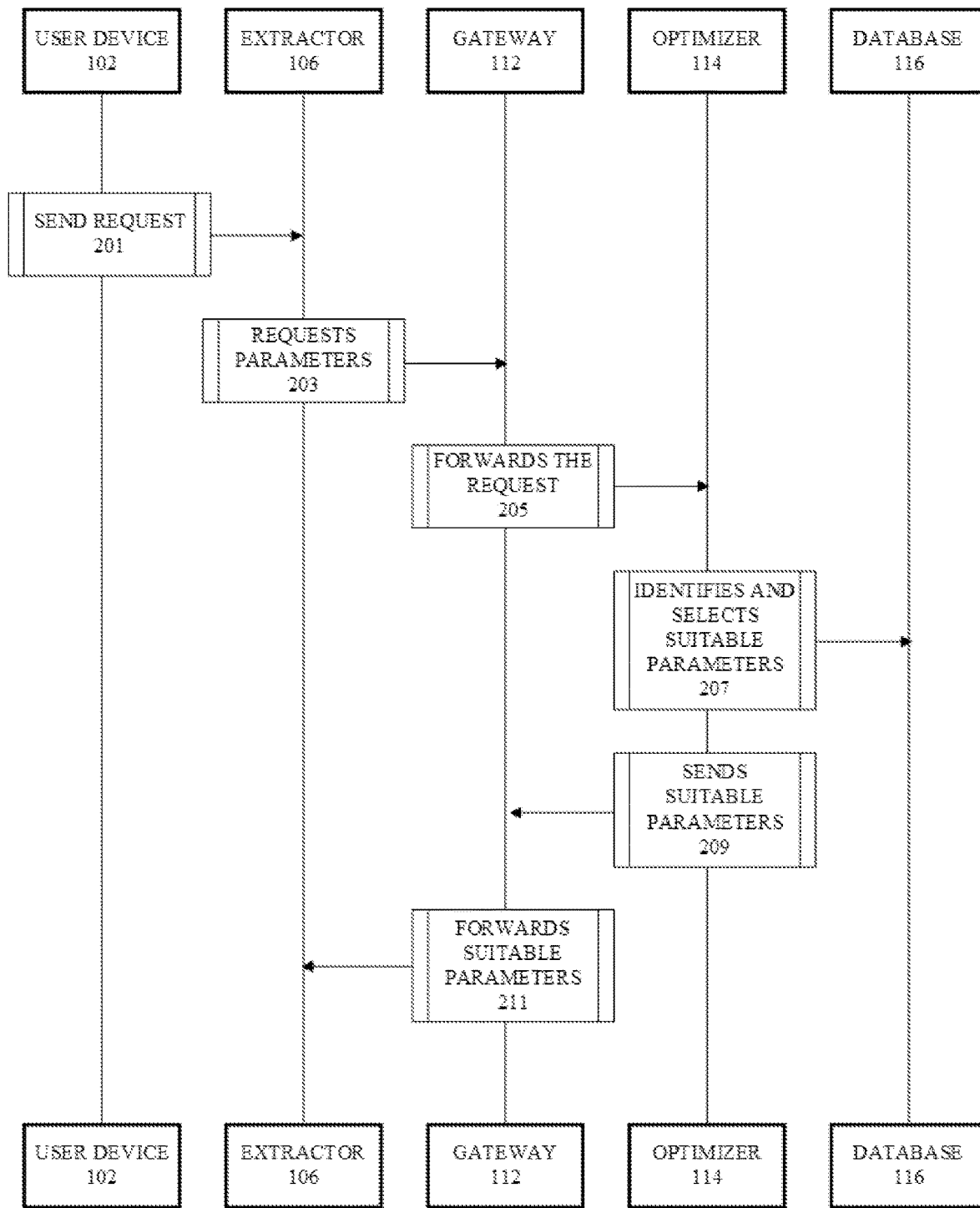
FIG. 2A is an exemplary sequence diagram showing the effective execution of a data collection (scraping) request.

FIG. 2A is an exemplary sequence diagram showing the effective execution of a data collection request. In step 201, user device 102 sends a data collection request intending to acquire data from target 124 to extractor 106. In the current embodiment, extractor 106 is present within service provider infrastructure 104. The data collection request sent by user device 102 may comprise multiple information, including but not limited to an URL of the target (in this case, URL of target 124) and one or more data collection parameter(s) that must be adhered to while executing the particular request.

In the most general sense, the term 'URI' (Uniform Resource Locator) is a reference to a web resource that specifies the location of the web resource on a computer network and a mechanism for retrieving data from the particular web resource. Therefore, the URL of target 124 provides the address/location of target 124 on network 126 and the mechanism for accessing and retrieving data from target 124.

Similarly, the term 'parameter', as described herein, may refer to a wide range of specifications that are necessary to execute data collection requests successfully and efficiently. At times, the term 'parameter(s)' or 'data collection parameter(s)' may be used interchangeably with each other. For example, parameters may include specifications about the required type of proxy, the required location of the proxy server, and the required type of operating system. To expand further, a typical list of parameters that are essential for successful data collection requests are, but are not limited to
proxy type;
proxy location;
proxy ASN (Autonomous System Number);
Operating system preference;
Browser preference;
conditions for headers;
protocol type and version.

However, at the initial stage, the data collection request originating from user device 102 may include one or more of the above-mentioned parameters such as, for example, proxy location and proxy type depending upon the resources available to user device 102 and on the configuration of the extractor 106.

After receiving the data collection request from user device 102, extractor 106, in one embodiment, may be configured by SPI 104 to disregard every parameter accompanying the URL of target 124. In such an embodiment, in step 203, extractor 106 submits a request to gateway 112 requesting for a complete set of suitable parameters to execute the particular data collection request on target 124 effectively. The request submitted by extractor 106, among other things, may comprise the URL of target 124.

In step 205, gateway 112 accepts the request from extractor 106 and forwards the request to optimizer 114. Moreover, the terms 'set of suitable parameters' or 'complete set of suitable parameters' or 'complete set' as described herein may refer to a list of specific parameters identified to be suitable to execute a particular data collection request effectively. Moreover, the number of parameters present in a 'set' depends on the policy configuration of extractor 106 and service provider infrastructure 104.

In step 207, optimizer 114, after receiving the request from gateway 112, initiates the process to identify and select the complete set of suitable parameters. Specifically, the steps carried out by optimizer 114 to identify and select the set of suitable parameters include a) accessing and retrieving multiple sets of parameters coupled with their respective scores from database 116; b) implementing any one of the machine learning algorithms such as, for example, the Epsilon Greedy Arm algorithm to process the multiple sets of parameters and ultimately to identify and select the set of suitable parameters. After identifying and selecting the set of suitable parameters, in step 209, optimizer 114 sends the set of suitable parameters to gateway 112. Consequently, in step 211, gateway forwards the set of suitable parameters to extractor 106.

Figure 2B:
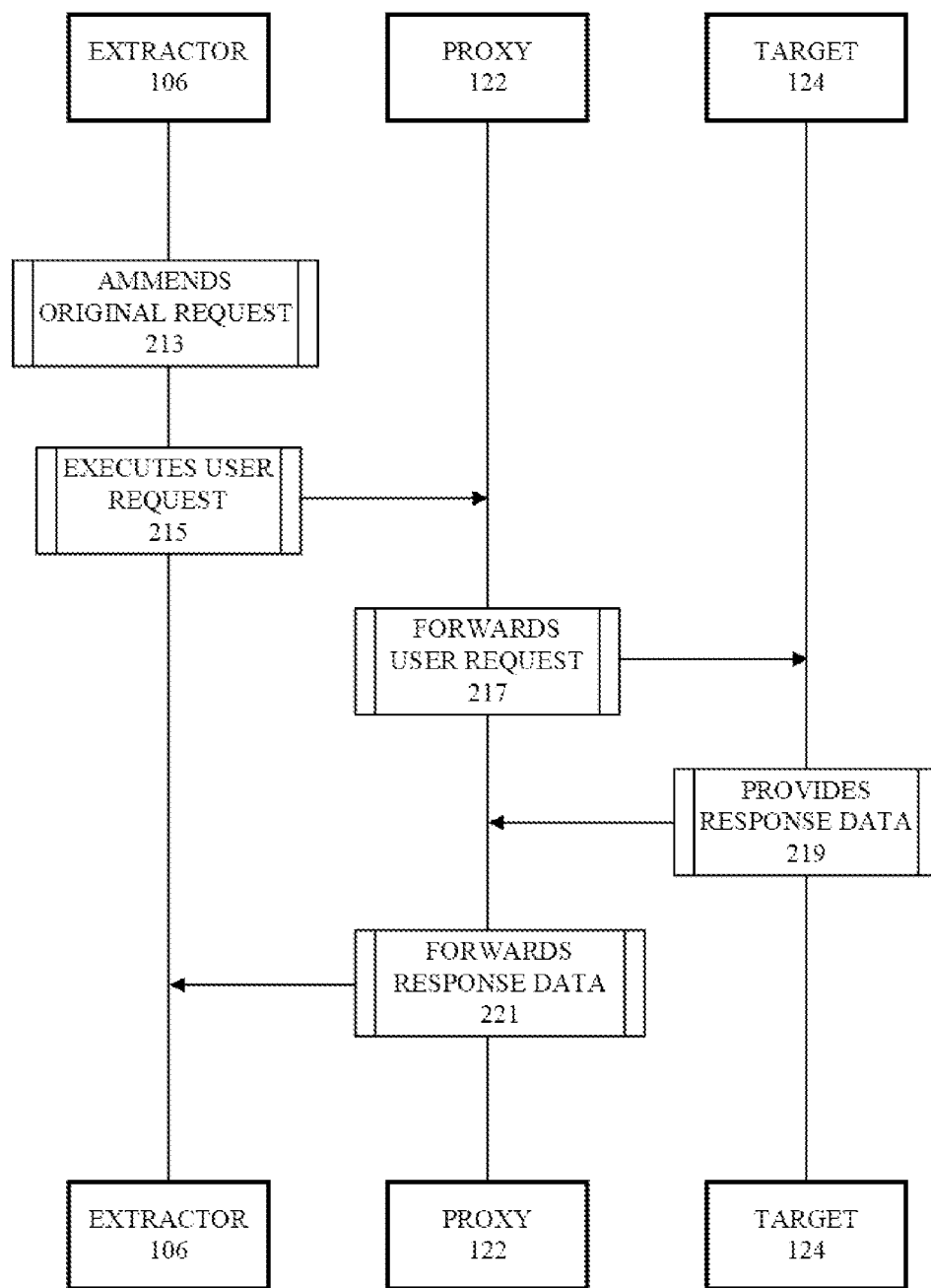
FIG. 2B is the continuation of an exemplary sequence diagram showing the effective execution of a data collection (scraping) request.

FIG. 2B is the continuation of an exemplary sequence diagram showing the effective execution of a data collection request. In step 213, extractor 106 proceeds to amend the original data collection request according to the complete set of suitable parameters. As part of step 213, extractor 106 may request proxy rotator 108 (not shown here) to obtain the information (such as for example the IP address) of a specific proxy server (represented here by proxy 122) contained in the complete set of suitable parameters. After amending, in step 215, extractor 106 executes the data collection request through proxy 122. Specifically, extractor 106 sends the amended data collection request to proxy 122. Consequently, in step 217, proxy 122 receives and forwards the data collection request to target 124.

In step 219, target 124 responds to the data collection request by providing the relevant response data. Target 124 sends the response data to proxy 122. In step 221, proxy 122 receives and forwards the response data to extractor 106.

Figure 2C:
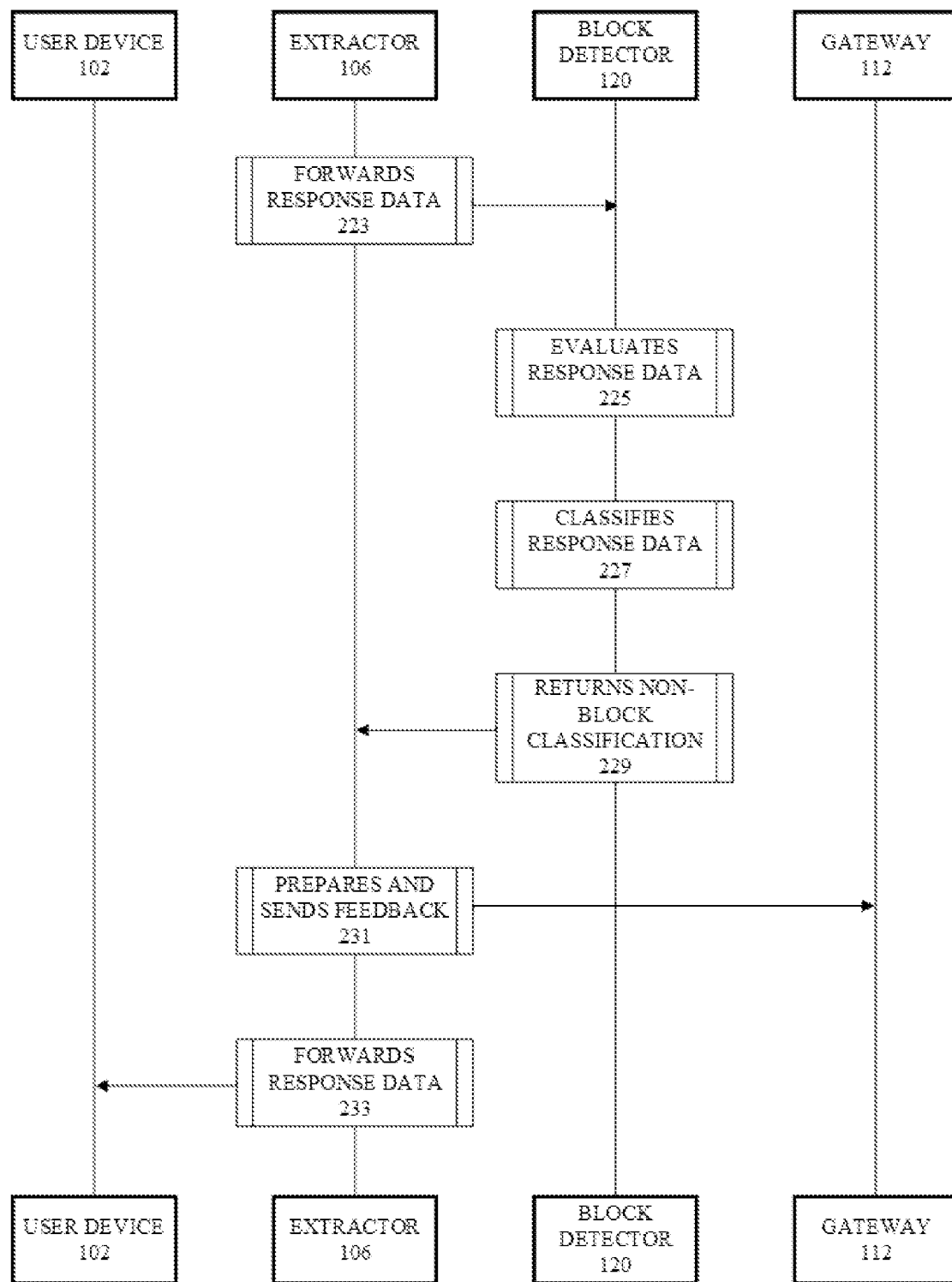
FIG. 2C is the continuation of an exemplary sequence diagram showing the effective execution of a data collection (scraping) request.

FIG. 2C is the continuation of an exemplary sequence diagram showing the effective execution of a data collection request. After receiving the response data, in step 223, extractor 106 sends the response data to block detector 120. Block detector 120 receives and evaluates the response data in step 225. Block detector 120 may employ several advanced algorithms to evaluate the response data. Block detector 120 evaluates the response data by employing multiple advanced algorithms to classify the response data as either 'block' or 'non-block'. A 'block' classification implies that the response data contain discrepancies or no valid data. On the contrary, a 'non-block' classification implies that the response data contain valid data and can be returned to user device 102.

Therefore in the example shown in FIG. 2C, block detector 120 is depicted classifying the response data as 'non-block'. Accordingly, in step 227, block detector 120 classifies the response data and in step 229 sends the classification decision to extractor 106. In step 231, after receiving the classification decision, extractor 106 prepares and sends feedback data to gateway 112. Feedback data sent by extractor 106 is intended to communicate the effectiveness of the particular set of suitable parameters in executing the data collection request on target 124.

The effectiveness of the suitable set of parameters is said to be insufficient when the classification decision received from block detector 120 is a 'block'. On the contrary, the effectiveness of the suitable set of parameters is said to be optimal when the classification decision received from the block detector 120 is a 'non-block'. Therefore, according to the classification decision, extractor 106 sends the feedback data to optimizer 114 via gateway 112. Moreover, feedback data, among many other things, may comprise the classification decision received from block detector 120, URL of target 124 and the particular set of suitable parameters.

Figure 4:
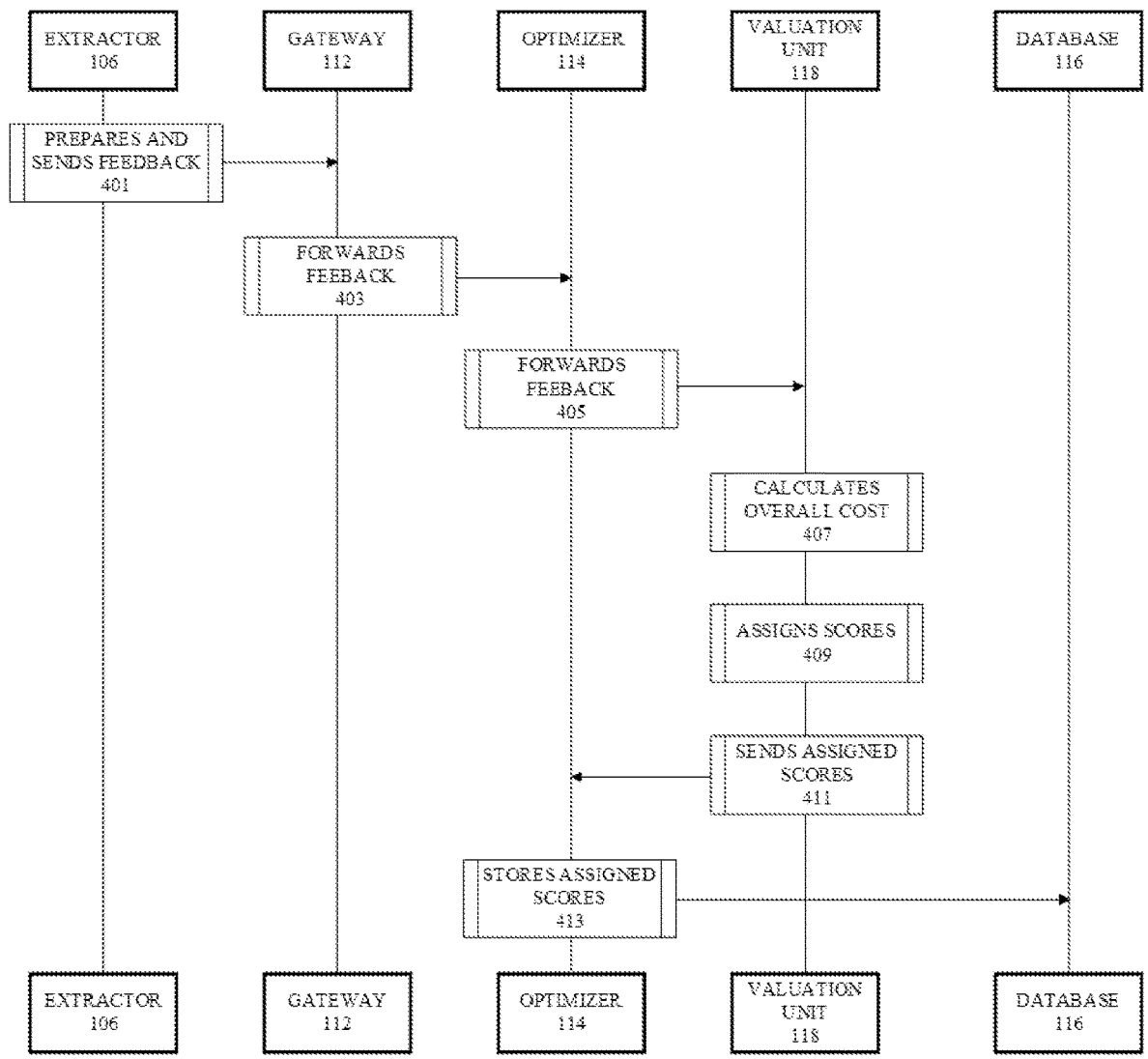
FIG. 4 is an exemplary sequence diagram showing the flow of feedback data.

After step 231, the process flow can occur in two concurrent directions:
a. Gateway 112 receives the feedback data from extractor 106 and forwards the feedback data to optimizer 114 (shown in FIG. 4). FIG. 4 shows the corresponding steps that are performed in relation to the feedback data. Further in FIG. 4, one could observe that optimizer 114 receives and forwards the feedback data to valuation unit 118, where the feedback data is scored and later stored in the database 116. The descriptions of the corresponding steps are detailed in the later parts of this disclosure.
b. Extractor 106 forwards the response data to user device 102, shown in step 233 of FIG. 2C.

The complete set of parameters in some instances, might not be effective in executing the data collection request. This lack of effectiveness is due to target 124 responding differently to an already known set of suitable parameters. Thus, extractor 106, among other things, sends the response data to block detector 120 in order to ascertain the effectiveness of the complete set of suitable parameters.

Figure 2D:
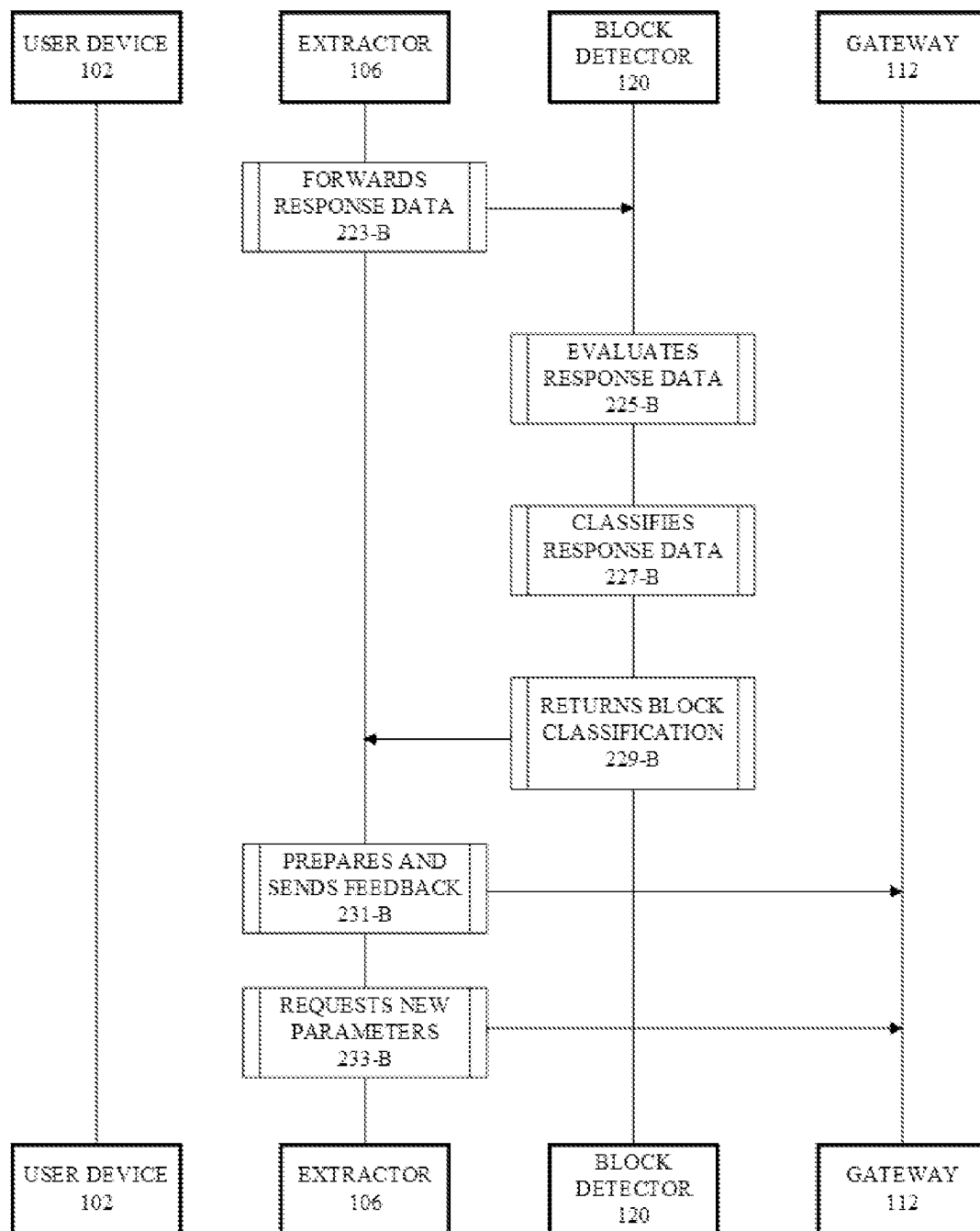
FIG. 2D is the continuation of an exemplary sequence diagram showing the effective execution of a data collection (scraping) request.

As mentioned earlier, block detector 120 evaluates the response data and classifies the response data as either 'block' or 'non-block'. Therefore, FIG. 2D shows an alternative flow to 2C, i.e., when block detector 120 classifies the response data as 'block'. In step 223-B extractor 106 sends the response data to block detector 120. Block detector 120 receives and evaluates the response data in step 225-B. Consecutively in step 227-B, block detector 120 classifies the response data and in step 229-B sends the classification decision to extractor 106. In FIG. 2D, block detector 120 classifies the response data as 'block'. In step 231-B, after receiving the classification decision, extractor 106 prepares and sends feedback data to gateway 112. Feedback data sent by extractor 106 is intended to communicate the effectiveness of the particular set of suitable parameters in executing the data collection request on target 124.

The effectiveness of the suitable set of parameters is said to be insufficient when the classification decision received from block detector 120 is a 'block'. On the contrary, the effectiveness of the suitable set of parameters is said to be optimal when the classification decision received from the block detector 120 is a 'non-block'. Therefore, according to the classification decision, extractor 106 sends the feedback data to optimizer 114 via gateway 112. Moreover, feedback data, among many other things, may comprise the classification decision received from block detector 120, URL of target 124 and the particular set of suitable parameters.

Following the step 231-B the process flow can occur in two concurrent directions:
a. Gateway 112 receives the feedback data from extractor 106 and forwards the feedback data to optimizer 114 (shown in FIG. 4). FIG. 4 shows the corresponding steps that are performed in relation with the feedback data. Further in FIG. 4, one could observe that optimizer 114 receives and forwards the feedback data to valuation unit 118, where the feedback data is scored and later stored in the database 116. The descriptions of the corresponding steps are detailed in the later parts of this disclosure.
b. Extractor 106, step 233-B, submits a new request to gateway 112 requesting for another complete set of suitable parameters to execute the particular data collection request on target 124 effectively. The request submitted by extractor 106, among other things, may comprise the URL of target 124. Subsequently, steps 205-223 are repeated till the response data is classified as 'non-block' by block detector 120. After which, extractor 106 forwards the response data to user device 102.

Figure 3A:
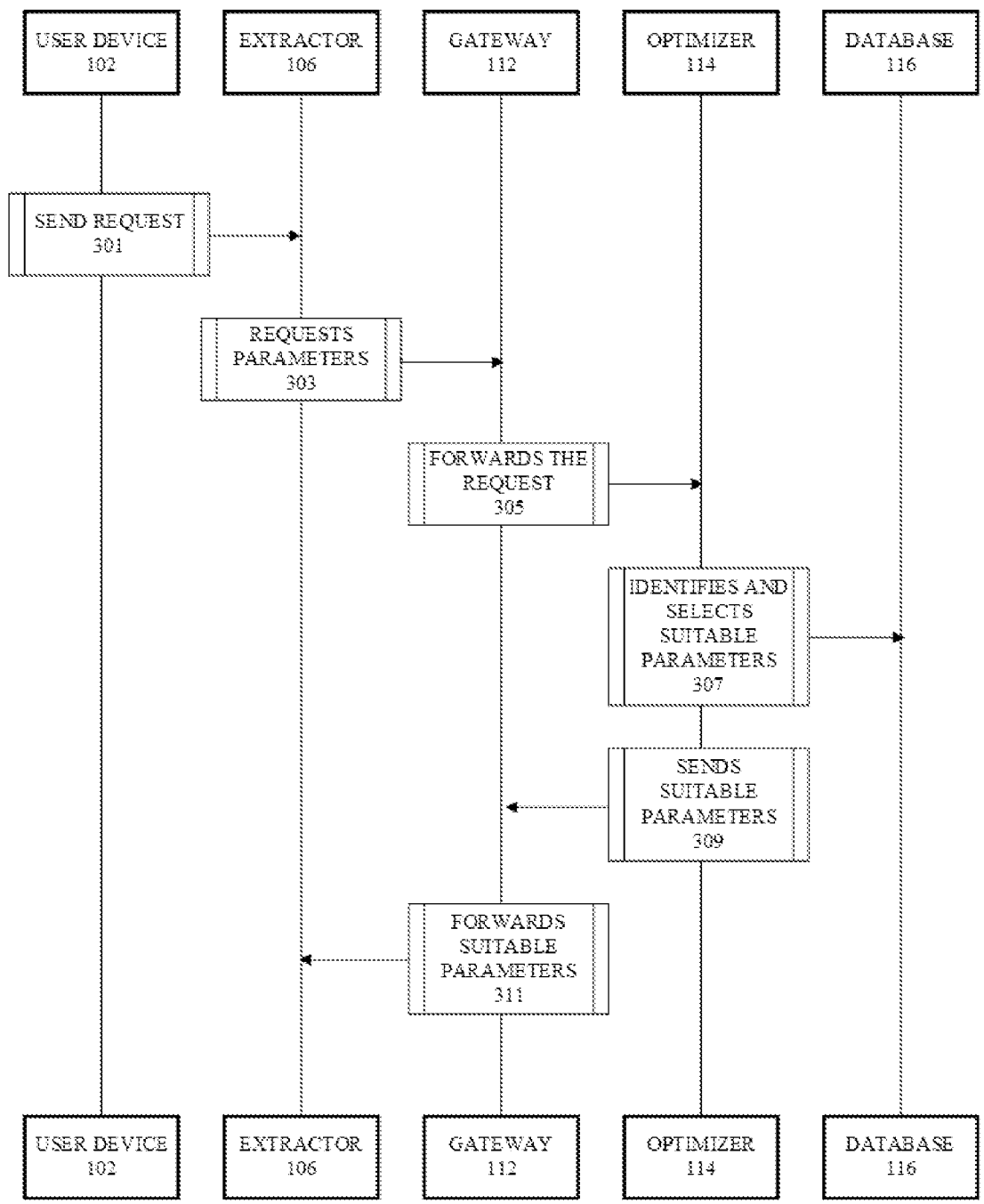
FIG. 3A is an exemplary sequence diagram showing the effective execution of data collection requests by accepting one or more data collection (scraping) parameters from user device 102.

In another embodiment, extractor 106 may be configured by SPI 104 to accept one or more specific parameters accompanying the URL of target 124 and disregard other parameters. FIG. 3A is an exemplary sequence diagram showing the effective execution of data collection requests by accepting one or more data collection parameters from user device 102.

In step 301, user device 102 sends a data collection request intending to acquire data from target 124 to extractor 106. In the current embodiment, extractor 106 is present within service provider infrastructure 104. The data collection request sent by user device 102 may comprise multiple information, including but not limited to an URL of the target (in this case, URL of target 124) and one or more data collection parameter(s) that must be adhered to while executing the particular request.

After receiving the data collection request from user device 102, in step 303, extractor 106 submits a request to gateway 112 for a partial set of suitable parameters to execute the particular data collection request on target 124 effectively. Here, the partial set of suitable parameters will comprise the accepted parameter(s) coupled with several other suitable parameters necessary to effectively execute the particular data collection request. Moreover, the request submitted by extractor 106, among other things, may comprise the URL for target 124 and the accepted parameter(s) from user device 102.

In step 305, gateway 112 accepts the request from extractor 106 and forwards the request to optimizer 114. In step 307, after receiving the request from gateway 112, optimizer 114 initiates the process to identify and select the partial set of suitable parameters. Specifically, the steps carried out by optimizer 114 to identify and select the partial set of suitable parameters include a) accessing and retrieving multiple sets of parameters coupled with their respective scores from database 116; b) implementing any one of the machine learning algorithms such as, for example, the Epsilon Greedy Arm algorithm to process the multiple sets of parameters and ultimately to identify and select the set of suitable parameters. After identifying and selecting the partial set of suitable parameters, in step 309, optimizer 114 sends the partial set of suitable parameters to gateway 112. Consecutively, in step 311, gateway forwards the partial set of suitable parameters to extractor 106.

Figure 3B:
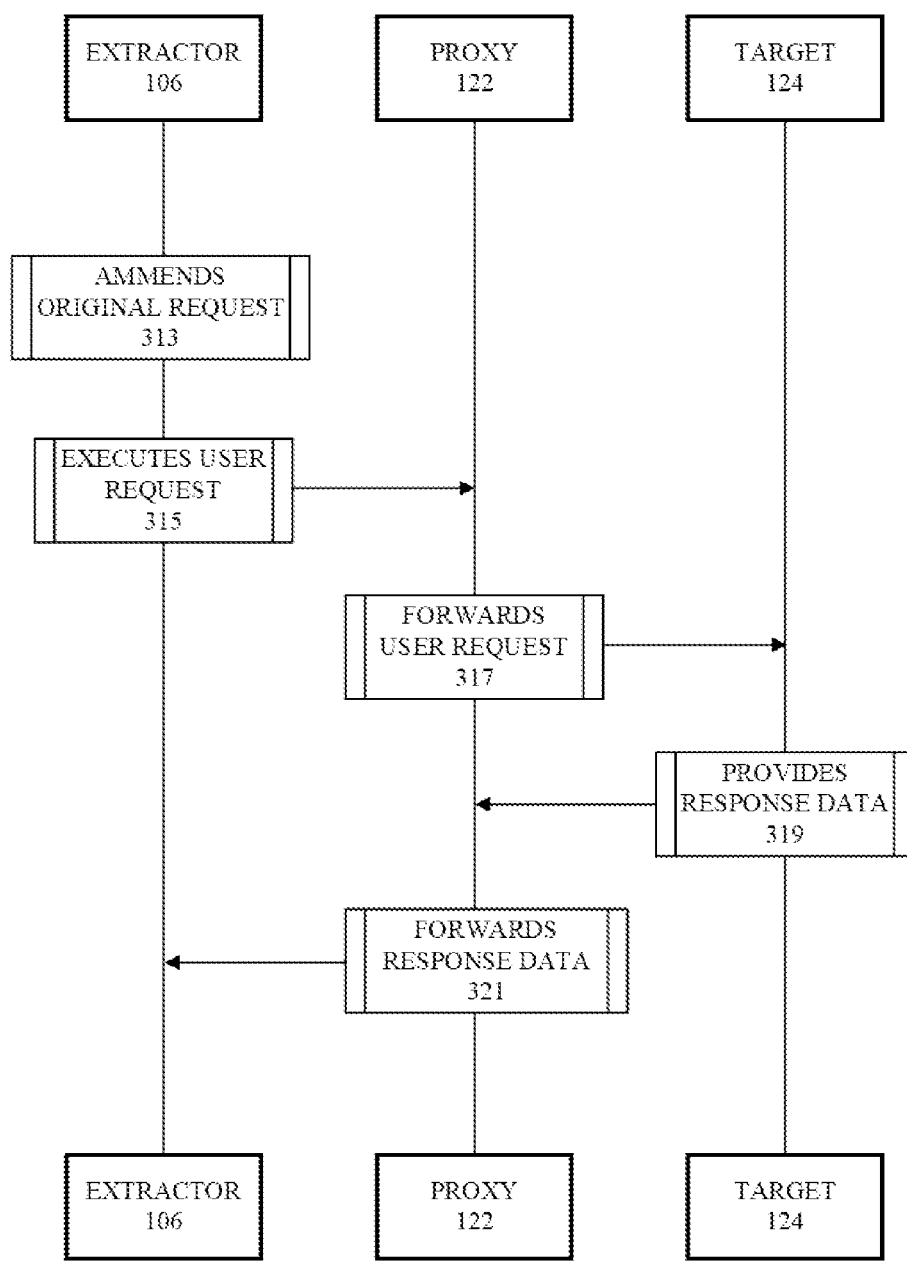
FIG. 3B is the continuation of an exemplary sequence diagram showing the effective execution of a data collection (scraping) request by accepting one or more data collection parameters from user device 102.

FIG. 3B is the continuation of an exemplary sequence diagram showing the effective execution of a data collection request by accepting one or more data collection parameters from user device 102. In step 313, extractor 106 proceeds to amend the original data collection request according to the partial set of suitable parameters. As part of step 313, extractor 106 may request proxy rotator 108 (not shown here) to obtain the information (such as for example the IP address) of a specific proxy server (represented here by proxy 122) contained in the complete set of suitable parameters. After amending, in step 315, extractor 106 executes the data collection request through proxy 122. Specifically, extractor 106 sends the amended data collection request to proxy 122. Consequently, in step 317, proxy 122 receives and forwards the data collection request to target 124.

In step 319, target 124 responds to the data collection request by providing the relevant response data. Target 124 sends the response data to proxy 122. In step 321, proxy 122 receives and forwards the response data to extractor 106.

Figure 3C:
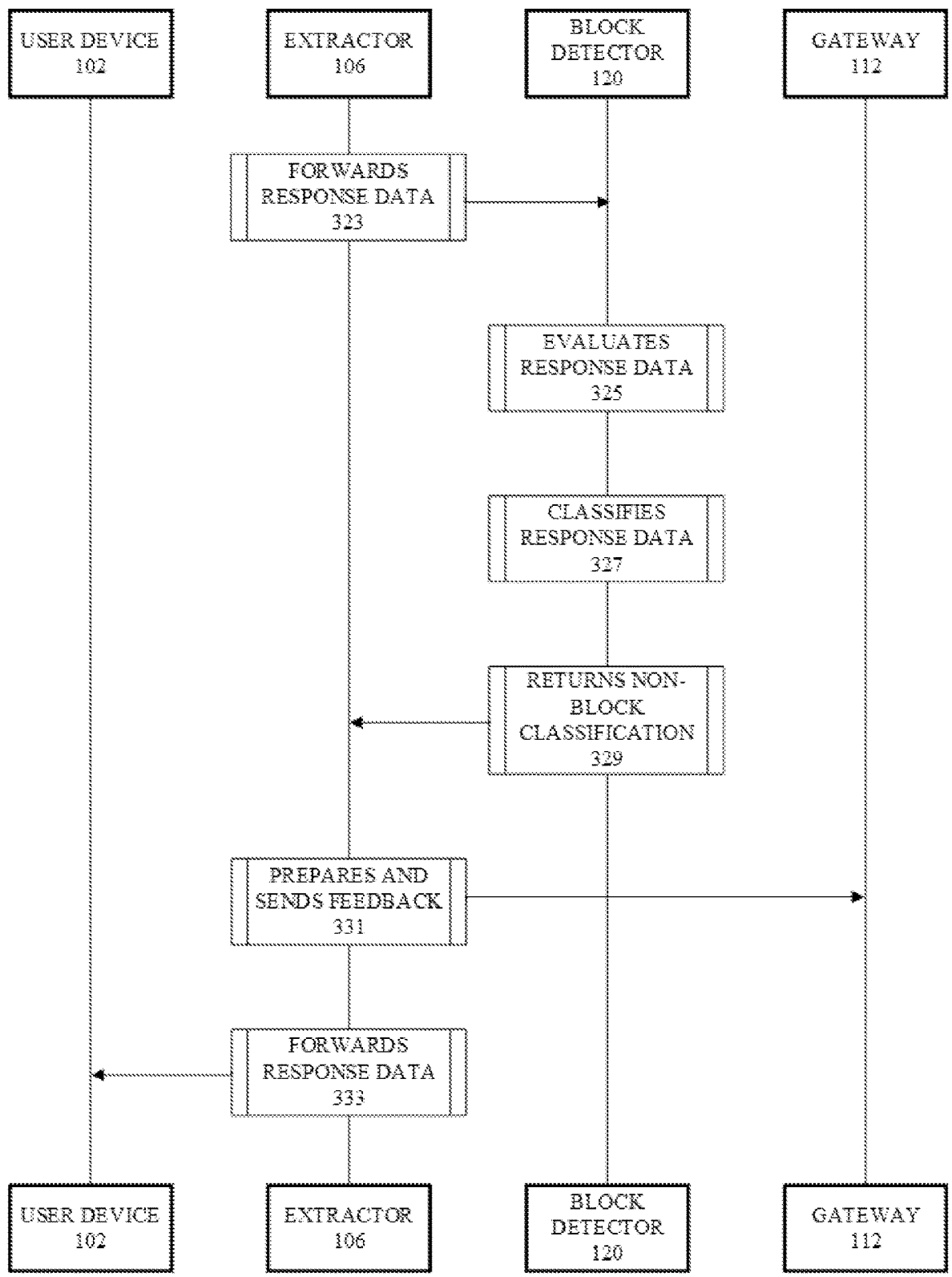
FIG. 3C is the continuation of an exemplary sequence diagram showing the effective execution of a data collection (scraping) request by accepting one or more data collection parameters from user device 102.

FIG. 3C is the continuation of an exemplary sequence diagram showing the effective execution of a data collection request by accepting one or more data collection parameters from user device 102. After receiving the response data, in step 323, extractor 106 sends the response data to block detector 120. Block detector 120 receives and evaluates the response data in step 325. Block detector 120 may employ several advanced algorithms to evaluate the response data. Block detector 120 evaluates the response data by employing multiple advanced algorithms to classify the response data as either 'block' or 'non-block'. A 'block' classification implies that the response data contain discrepancies or no valid data. On the contrary, a 'non-block' classification implies that the response data contain valid data and can be returned to user device 102.

Therefore in the example shown in FIG. 3C, block detector 120 is depicted classifying the response data as 'non-block'. Accordingly, in step 327, block detector 120 classifies the response data and in step 329 sends the classification decision to extractor 106. In step 331, after receiving the classification decision, extractor 106 prepares and sends feedback data to gateway 112. Feedback data sent by extractor 106 is intended to communicate the effectiveness of the particular set of suitable parameters in executing the data collection request on target 124.

The effectiveness of the suitable set of parameters is said to be insufficient when the classification decision received from block detector 120 is a 'block'. On the contrary, the effectiveness of the suitable set of parameters is said to be optimal when the classification decision received from the block detector 120 is a 'non-block'. Therefore, according to the classification decision, extractor 106 sends the feedback data to optimizer 114 via gateway 112. Moreover, feedback data, among many other things, may comprise the classification decision received from block detector 120, URL of target 124 and the particular set of suitable parameters.

After step 331, the process flow can occur in two concurrent directions:

c. Gateway 112 receives the feedback data from extractor 106 and forwards the feedback data to optimizer 114 (shown in FIG. 4). FIG. 4 shows the corresponding steps that are performed in relation to the feedback data. Further in FIG. 4, one could observe that optimizer 114 receives and forwards the feedback data to valuation unit 118, where the feedback data is scored and later stored in the database 116. The descriptions of the corresponding steps are detailed in the later parts of this disclosure.

d. Extractor 106 forwards the response data to user device 102, shown in step 333 of FIG. 3C.

The partial set of parameters in some instances, might not be effective in executing the data collection request. This lack of effectiveness is due to Target 124 responding differently to an already known set of suitable parameters. Thus, Extractor 106, among other things, sends the response data to block detector 120 in order to ascertain the effectiveness of the partial set of suitable parameters.

Figure 3D:
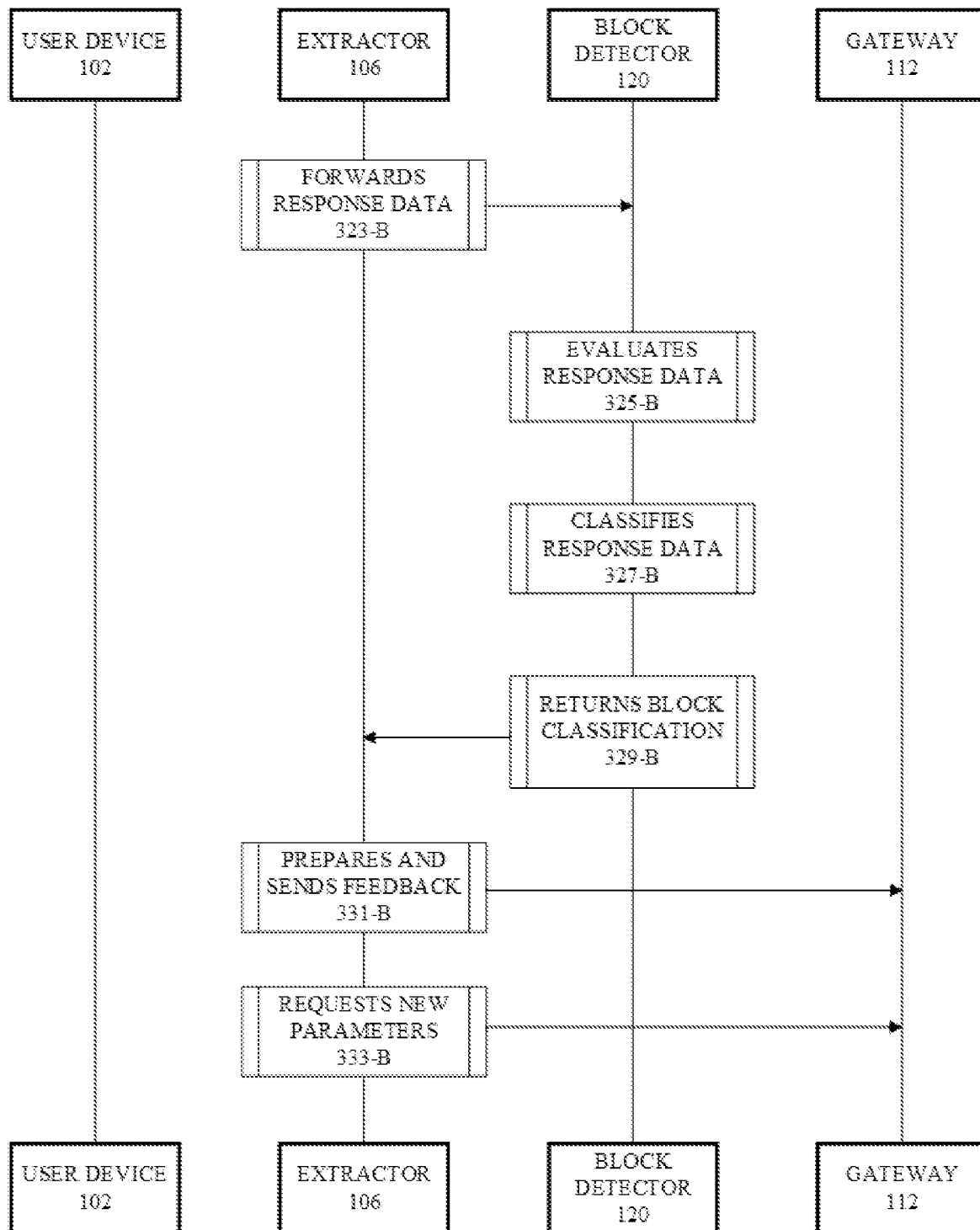
FIG. 3D is the continuation of an exemplary sequence diagram showing the effective execution of a data collection (scraping) request by accepting one or more data collection (scraping) parameters from user device 102.

As mentioned earlier, block detector 120 evaluates the response data and classifies the response data as either 'block' or 'non-block'. Therefore, FIG. 3D shows an alternative flow to 3C, i.e., when block detector 120 classifies the response data as 'block'. In step 323-B extractor 106 sends the response data to block detector 120. Block detector 120 receives and evaluates the response data in step 325-B. Consecutively in step 327-B, block detector 120 classifies the response data and in step 329-B sends the classification decision to extractor 106. In FIG. 3D, block detector classifies the response data as 'block'. In step 331-B, after receiving the classification decision, extractor 106 prepares and sends feedback data to gateway 112. Feedback data sent by extractor 106 is intended to communicate the effectiveness of the particular set of suitable parameters in executing the data collection request on target 124.

The effectiveness of the suitable set of parameters is said to be insufficient when the classification decision received from block detector 120 is a 'block'. On the contrary, the effectiveness of the suitable set of parameters is said to be optimal when the classification decision received from the block detector 120 is a 'non-block'. Therefore, according to the classification decision, extractor 106 sends the feedback data to optimizer 114 via gateway 112. Moreover, feedback data, among many other things, may comprise the classification decision received from block detector 120, URL of target 124 and the particular set of suitable parameters.

Following the step 331-B the process flow can occur in two concurrent directions:

c. Gateway 112 receives the feedback data from extractor 106 and forwards the feedback data to optimizer 114 (shown in FIG. 4). FIG. 4 shows the corresponding steps that are performed in relation with the feedback data. Further in FIG. 4, one could observe that optimizer 114 receives and forwards the feedback data to valuation unit 118, where the feedback data is scored and later stored in the database 116. The descriptions of the corresponding steps are detailed in the later parts of this disclosure.

d. Extractor 106, step 333-B, submits a new request to gateway 112 requesting for another complete set of suitable parameters to execute the particular data collection request on target 124 effectively. The request submitted by extractor 106, among other things, may comprise the URL of target 124. Subsequently, steps 305-323 are repeated till the response data is classified as 'non-block' by block detector 120. After which, extractor 106 forwards the response data to user device 102.

FIG. 4 is an exemplary sequence diagram showing the flow of feedback data. In step 401, extractor 106 prepares and sends the feedback data to gateway 112 after receiving the classification decision from block detector 120. After receiving the feedback data from extractor 106, in step 403, gateway 112 forwards the feedback data to optimizer 114. Subsequently, in step 405, optimizer 114 receives and forwards the feedback data to valuation unit 118. In step 407, valuation unit 118 receives the feedback data and begins the process of calculating the overall cost for the particular set of suitable parameters (the set can either be partial or complete). In the current embodiment, the configuration files present within the valuation unit 118 provides the cost information for each parameter present in the particular set of suitable parameters. After obtaining the cost information of each parameter present in the particular set, valuation unit 118 calculates the overall cost for the particular set of suitable parameters. Feedback data, among other things, may comprise the classification decision received from block detector 120, URL of target 124 and the particular set of suitable parameters. Moreover, in some embodiments, the valuation unit 118 can access an external element to receive the cost information for each parameter present in the particular set of suitable parameters.

In step 409, valuation unit 118 scores the particular set of suitable parameters Specifically, valuation unit 118 scores the set of suitable parameters based on the feedback data and the overall cost to implement the set of suitable parameters while executing the particular data collection request. Certain parameters (such as for example, using a particular type of proxy server, using a proxy server from a certain geo-location) can be expensive therefore, optimizer 114 must be able to identify and select the set of parameters that is both suitable and cost-effective i.e., economical to implement.

Therefore, valuation unit 118, for instance, may assign the highest score to the set of parameters that has a 'non-block' classification decision and lowest implementation cost. Similarly, valuation unit 118 may assign the lowest score to the set of parameters that has a 'block' classification decision and highest implementation cost. Moreover, valuation unit 118 may assign the scores based on a specific machine learning algorithm.

After assigning the score to the particular set of suitable parameters, in step 411, valuation unit 118 sends the assigned score to optimizer 114. In step 413, optimizer 114 receives and forwards the score to database 116. The assigned score is stored coupled with the particular set of suitable parameters in database 116.

Figure 5:
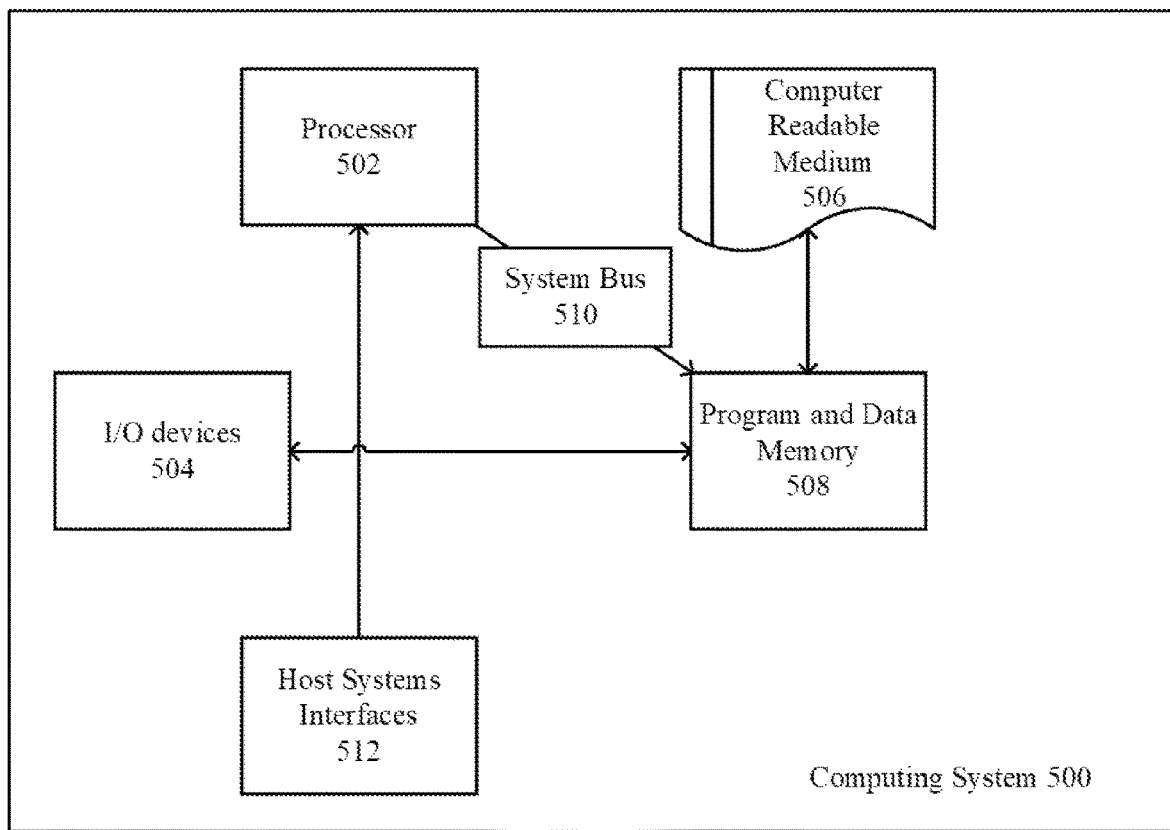
FIG. 5 shows a block diagram of an exemplary computing system.

The embodiments herein may be combined or collocated in a variety of alternative ways due to design choice. Accordingly, the features and aspects herein are not in any way intended to be limited to any particular embodiment. Furthermore, the embodiments can take the form of hardware, firmware, software, and/or combinations thereof. In one embodiment, such software includes but is not limited to firmware, resident software, microcode, etc. FIG. 5 illustrates a computing system 500 in which a computer readable medium 503 may provide instruction for performing any methods and processes disclosed herein.

Furthermore, some aspects of the embodiments herein can take the form of a computer program product accessible from the computer readable medium 506 to provide program code for use by or in connection with a computer or any instruction execution system. For the purposes of this description, the computer readable medium 506 can be any apparatus that can tangibly store the program code for use by or in connection with the instruction execution system, apparatus, or device, including the computing system 500.

The computer readable medium 506 can be any tangible electronic, magnetic, optical, electromagnetic, infrared, or semiconductor system (or apparatus or device). Some examples of a computer readable medium 506 include solid state memories, magnetic tapes, removable computer diskettes, random access memories (RAM), read-only memories (ROM), magnetic disks, and optical disks. Some examples of optical disks include read only compact disks (CD-ROM), read/write compact disks (CD-R/W), and digital versatile disks (DVD).

The computing system 500 can include one or more processors 502 coupled directly or indirectly to memory 508 through a system bus 510. The memory 508 can include local memory employed during actual execution of the program code, bulk storage, and/or cache memories, which provide temporary storage of at least some of the program code in order to reduce the number of times the code is retrieved from bulk storage during execution.

Input/output (I/O) devices 504 (including but not limited to keyboards, displays, pointing devices, I/O interfaces, etc.) can be coupled to the computing system 500 either directly or through intervening I/O controllers. Network adapters may also be coupled to the computing system 500 to enable the computing system 500 to couple to other data processing systems, such as through host systems interfaces 512, printers, and/or storage devices through intervening private or public networks. Modems, cable modems, and Ethernet cards are just examples of network adapter types.

In one exemplary aspect, this disclosure presents a method to optimize a scraping request by identifying suitable parameters while executing the scraping request, the method comprising: a) executing a scraping request; b) receiving a result of the scraping request, wherein the result comprises at least: a classification decision, a target domain, and a set of scraping request parameters, wherein the set of scraping request parameters comprises either a full set, which includes an entirety of the scraping request parameters, or a partial set, which includes less than the entirety of the scraping request parameters; c) scoring the set of scraping request parameters to form a scored set of scraping request parameters; d) storing the scored set of scraping request parameters, related to the target domain, with respective scoring results in a database; e) selecting from the database a subsequent scored set of scraping request parameters comprising either the full set or a subsequent scored partial set, which includes less than the entirety of the scraping request parameters and which is not identical to the scored set of scraping request parameters, for a subsequent scraping request, by: retrieving at least one scored set of scraping request parameters, related to the Uniform Resource Locator (URL) of the target domain, coupled with respective scores; and applying a machine learning algorithm to process the at least one set of scored scraping request parameters.

The classification decision in at least one exemplary disclosed method can be a 'block' response or a 'non-block' response. The set of scraping request parameters receiving the 'non-block' response of the classification decision receives a higher score than the set of scraping request parameters receiving the 'block' response. The set of scraping request parameters receiving the 'block' response of the classification decision receives a lower score than the set of scraping request parameters receiving the 'non-block' response. If the classification decision receives the 'block' response for the subsequent scraping request, the method to optimize a scraping request by identifying suitable parameters while executing the scraping request is repeated with a new set of scored scraping request parameters. The method to optimize a scraping request by identifying suitable parameters while executing the scraping request is repeated for the subsequent scraping request until the classification decision is the 'non-block' response or a maximum threshold of attempts is reached. The data from the 'non-block' response is used for future scraping actions.

The exemplary method further discloses that the scoring of the set of scraping request parameters is affected by an amount of overall scraping request cost calculated for the used parameters.

The exemplary method further discloses that the partial set of the scraping request parameters comprises a single scraping request parameter or comprises a combination of any of the following parameters: proxy type; proxy location; proxy ASN (Autonomous System Number); operating system preference; browser preference; conditions for headers; Hypertext Transfer Protocol (HTTP) protocol type and version.

The exemplary method disclosed how the machine learning algorithm is modified as new scores for the scraping request parameters are recorded within different sets of parameters. Also, the method teaches that the subsequent scored set of the scraping request parameters can be identical to the set of the scraping request parameters.

In another aspect, the disclose also presents an exemplary method to increase a quality of data scraping from the Internet comprising: a) receiving, by an extractor, a scraping request to a target domain from a user device via a network; b) requesting, by the extractor, from an optimizer via a gateway, a set of scraping request parameters to execute the scraping request; c) receiving, by the optimizer, the scraping request, from the extractor via the gateway; d) responding, by the optimizer, to the scraping request by initiating a process of identifying and selecting a set of the scraping request parameters, with the set comprising either a full set, which includes an entirety of the scraping request parameters, or a partial set, which includes less than the entirety of the scraping request parameters, wherein, the optimizer identifies and selects the set of the scraping request parameters by accessing a database and by applying a machine learning algorithm; e) sending, by the optimizer, the set of the scraping request parameters to the extractor via the gateway; f) upon receiving the set of the scraping request parameters, requesting, by the extractor, from the proxy rotator, to select a proxy server serving the set of the scraping request parameters; g) using, by the extractor, the set of the scraping request parameters and the selected proxy server to implement the scraping request to the target domain; h) receiving, by the extractor, from the target domain through the proxy server, response data to the scraping request; i) sending, by the extractor, the response data to a block detector to evaluate if the response data is a 'block' response or a 'non-block' response; j) receiving, by the extractor, a classification decision from the block detector; k) preparing and sending feedback data, based on the classification decision, by the extractor, to the optimizer via the gateway; l) forwarding the feedback data, by the optimizer, to the validation unit; m) scoring, by the validation unit, the set of the scraping request parameters to form a scored set of the scraping request parameters; n) storing, in the database, the scored set of the scraping request parameters and respective scoring results related to the scraping request parameters and the target domain.

Accordingly, the feedback data is intended to communicate the effectiveness of the set of the scraping request parameters in executing the scraping request to the target domain. The feedback data contains at least one of the following: classification decision, target domain, or the set.

In the exemplary method disclosed, the scraping request comprises at least a URL of the target domain or one or more of the scraping request parameters.

In the exemplary method, upon receiving a subsequent scraping request, the extractor disregards every scraping parameter indicated in the subsequent scraping request and requests an optimizer for a complete set of scraping parameters to execute the scraping request on the target domain. Upon receiving a subsequent scraping request, the extractor uses one or more of the scraping request parameters from the subsequent scraping request and requests a partial selection of the scraping request parameters from the optimizer to execute the scraping request on the target domain.

And also, in yet another aspect, the disclosure presents an exemplary method to optimize a scraping request by identifying suitable parameters while executing the scraping request, the method comprising: a) executing a scraping request; b) receiving a result of the scraping request, wherein the result comprises at least: a classification decision, a target domain, and a set of scraping request parameters, wherein the set of scraping request parameters comprises either a full set, which includes an entirety of the scraping request parameters, or a partial set, which includes less than the entirety of the scraping request parameters; c) scoring the set of scraping request parameters to form a scored set of scraping request parameters; d) storing the scored set of scraping request parameters, related to the target domain, with respective scoring results in a database; e) selecting by the machine learning algorithm from the database a subsequent scored set of scraping request parameters comprising either the full set or a subsequent scored partial set, which includes less than the entirety of the scraping request parameters and which includes at least one scraping request parameter distinct from the scored set of scraping request parameters, for a subsequent scraping request, by: retrieving at least one scored set of scraping request parameters, related to the Uniform Resource Locator (URL) of the target domain, coupled with respective scores; and applying a machine learning algorithm to process the at least one set of scored scraping request parameters.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as a critical, required, or essential feature or element of any or all the claims. The invention is defined solely by the appended claims including any amendments made during the pendency of this application and all equivalents of those claims as issued.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without additional constraints, preclude the existence of additional identical elements in the process, method, article, and/or apparatus that comprises, has, includes, and/or contains the element. The terms "a" and "an" are defined as one or more unless explicitly stated otherwise herein. The terms "approximately", "about" or any other version thereof, are defined as being close to as understood by one of ordinary skill in the art. A device or structure that is "configured" in a certain way is configured in at least that way but may also be configured in ways that are not listed. For the indication of elements, a singular or plural form can be used, but it does not limit the scope of the disclosure and the same teaching can apply to multiple objects, even if in the current application an object is referred to in its singular form.

The exemplary disclosure is provided to allow the reader to quickly ascertain the nature of the technical disclosure. It is submitted with the understanding that it will not be used to interpret or limit the scope or meaning of the claims. In addition, in the foregoing detailed description, it is demonstrated that multiple features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment.

What is claimed is:

1. A computer-readable storage medium for optimizing a scraping request comprising instructions which, when executed by a computer device, causes the computer device to:
   execute the scraping request;
   receive a result of the scraping request, wherein the result comprises: a classification decision, a target domain, and a plurality of scraping request parameters;
   score each of the plurality of scraping request parameters to form a scored set of scraping request parameters;
   store the scored set of scraping request parameters with the result in a database;
   select from the database an other scored set of scraping request parameters comprising either an entirety of the plurality of scraping request parameters or a partial set of the plurality of scraping request parameters comprising less than an entirety of the plurality of scraping request parameters, wherein the other scored set of scraping parameters is not identical to the scored set of scraping request parameters; and,
   execute a subsequent scraping request with the other scored set of scraping request parameters by applying a machine learning algorithm to process the at least one set of scored scraping request parameters.

2. The computer-readable storage medium of claim 1, wherein the classification decision is a 'block' response or a 'non-block' response.

3. The computer-readable storage medium of claim 2, wherein the set of scraping request parameters receiving the 'non-block' response of the classification decision receives a higher score than the set of scraping request parameters receiving the 'block' response.

4. The computer-readable storage medium of claim 3, wherein the set of scraping request parameters receiving the 'block' response of the classification decision receives a lower score than the set of scraping request parameters receiving the 'non-block' response.

5. The computer-readable storage medium of claim 3, wherein, if the classification decision receives the 'block' response for the subsequent scraping request, the scraping request is repeated with a new set of scored scraping request parameters.

6. The computer-readable storage medium of claim 5, wherein the scraping request is repeated for the subsequent scraping request until the classification decision is the 'non-block' response or a maximum threshold of attempts is reached.

7. The computer-readable storage medium of claim 6, wherein data from the 'non-block' response is used for future scraping actions.

8. The computer-readable storage medium of claim 1, wherein the scoring of the set of scraping request parameters is affected by an amount of overall scraping request cost calculated for the scraping request parameters.

9. The computer-readable storage medium of claim 1, wherein the partial set of the plurality of scraping request parameters comprises a single scraping request parameter or comprises a combination of any of the following parameters:
   proxy type;
   proxy location;
   proxy ASN (Autonomous System Number);
   operating system preference;
   browser preference;
   conditions for headers;
   Hypertext Transfer Protocol (HTTP) protocol type and version.

10. The computer-readable storage medium of claim 1, wherein the machine learning algorithm is modified as new scores for the scraping request parameters are recorded within different sets of parameters.

11. The computer-readable storage medium of claim 1, wherein the subsequent scored set of the scraping request parameters is identical to the set of the scraping request parameters.

12. A computer-readable storage medium for increasing a quality of data scraping from the internet comprising instructions which, when executed by a computer device, causes the computer device to:

receive a scraping request via a network;

request a plurality of scraping request parameters to execute the scraping request;

receive the scraping request via the gateway;

initiate a process of identifying and selecting a set of scraping request parameters from the plurality of scraping request parameters, with the set comprising either an entirety of the plurality of scraping request parameters or a partial set of the plurality of scraping request parameters;

send the set of the scraping request parameters to an extractor via the gateway;

select a proxy server serving the set of the scraping request parameters;

implement the scraping request to the target domain using the set of scraping request parameters and the proxy server selected;

receive from the target domain response data to the scraping request;

send the response data to a block detector;

receive a classification decision from the block detector;

prepare and sending feedback data to the optimizer via the gateway;

forward the feedback data to the validation unit;

score the set of the scraping request parameters to form a scored set of the scraping request parameters; and, store the scored set of the scraping request parameters in the database and respective scoring results related to the scraping request parameters and the target domain.

13. The computer-readable storage medium of claim 12, wherein the feedback data is intended to communicate the effectiveness of the set of the scraping request parameters in executing the scraping request to the target domain.

14. The computer-readable storage medium of claim 12, wherein the feedback data contains at least one of the following: classification decision, target domain, or the set.

15. The computer-readable storage medium of claim 12, wherein the scraping request comprises at least a URL of the target domain or one or more of the scraping request parameters.

16. The computer-readable storage medium of claim 12, wherein, upon receiving a subsequent scraping request, the extractor disregards every scraping parameter indicated in the subsequent scraping request and requests an optimizer for a complete set of scraping parameters to execute the scraping request on the target domain.

17. The computer-readable storage medium of claim 12, wherein, upon receiving a subsequent scraping request, the extractor uses one or more of the scraping request parameters from the subsequent scraping request and requests a partial selection of the scraping request parameters from the optimizer to execute the scraping request on the target domain.

18. The computer-readable storage medium of claim 12, wherein, the optimizer identifies and selects the set of the scraping request parameters by accessing a database and by applying a machine learning algorithm.

19. The computer-readable storage medium of claim 12 wherein the block detector evaluates whether the response data is a 'block' response or a 'non-block' response.

20. The computer-readable storage medium of claim 12, wherein the extractor sends the feedback data to the optimizer through the gateway.

* * * * *